United States Patent [19]

Matsuoka et al.

[11] 4,386,398
[45] May 31, 1983

[54] AUTOMATIC DOOR CONTROL APPARATUS

[75] Inventors: Shigeru Matsuoka; Takeshi Tokunaga; Seiji Yonekura; Koji Yamauchi; Mitsuo Suzuki, all of Hitachi, Japan

[73] Assignee: Hitachi, Ltd., Tokyo, Japan

[21] Appl. No.: 248,537

[22] Filed: Mar. 27, 1981

[30] Foreign Application Priority Data

Mar. 28, 1980 [JP] Japan .................................. 55-38897
Mar. 28, 1980 [JP] Japan .................................. 55-38898
Mar. 28, 1980 [JP] Japan .................................. 55-38899

[51] Int. Cl.³ ...................... E05F 15/10; H02H 7/085
[52] U.S. Cl. .................................... 364/167; 364/513; 318/266; 318/466; 49/28
[58] Field of Search ........................ 364/176, 167, 513; 318/266, 281, 282, 286, 466; 49/28, 26, 139; 340/168 R, 527

[56] References Cited

U.S. PATENT DOCUMENTS

| | | | |
|---|---|---|---|
| 3,617,835 | 11/1971 | Dreher et al. | 318/466 X |
| 4,131,830 | 12/1978 | Lee et al. | 318/266 |
| 4,156,835 | 5/1979 | Whitney et al. | 364/513 X |
| 4,187,454 | 2/1980 | Ito et al. | 364/513 X |
| 4,328,540 | 5/1982 | Matsuoka et al. | 364/167 |
| 4,338,553 | 7/1982 | Scott, Jr. | 318/266 |
| 4,347,465 | 8/1982 | Goertler et al. | 318/466 X |

Primary Examiner—Edward J. Wise
Attorney, Agent, or Firm—Antonelli, Terry & Wands

[57] ABSTRACT

An automatic door operation control apparatus is disclosed which comprises a door operating device a driving device for opening and closing the door, a condition detector for detecting a condition under which the movement of the door by the driving device is required to be discontinued, and a main control device for issuing a driving command to the driving device to actuate the same as required in response to a condition detection signal from the condition detector. The apparatus further comprises an auxiliary control device for stopping the operation of the driving device in the event that the main control device fails to issue a command to the driving device to stop the door movement within a predetermined length of time in response to the condition detection signal from the condition detector.

12 Claims, 18 Drawing Figures

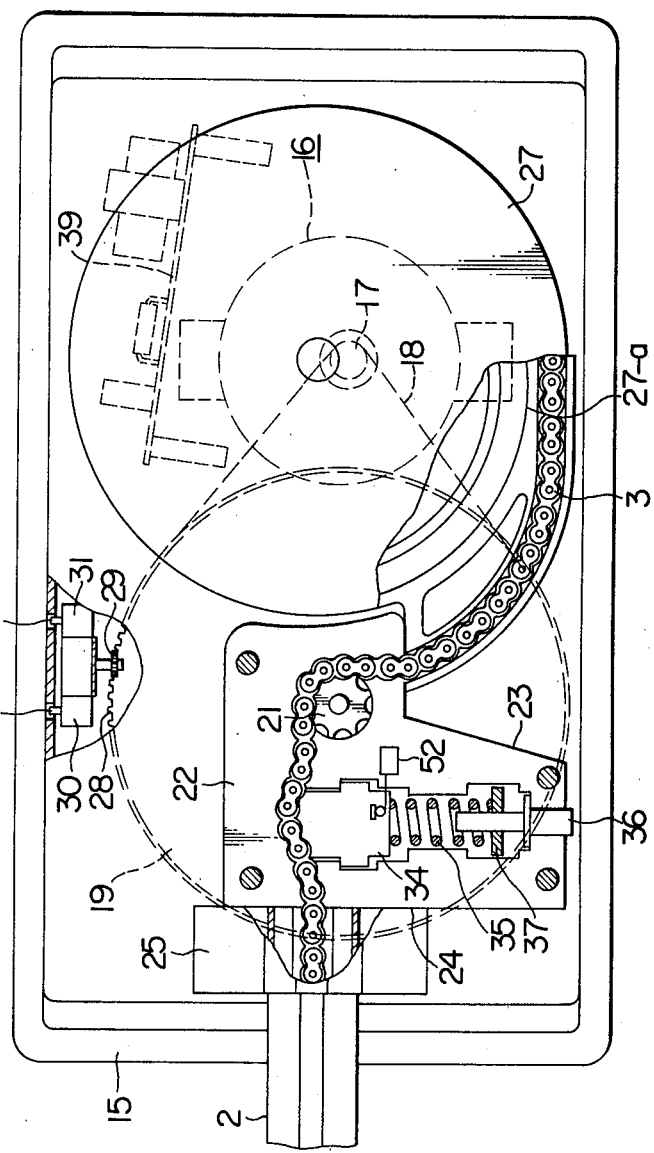

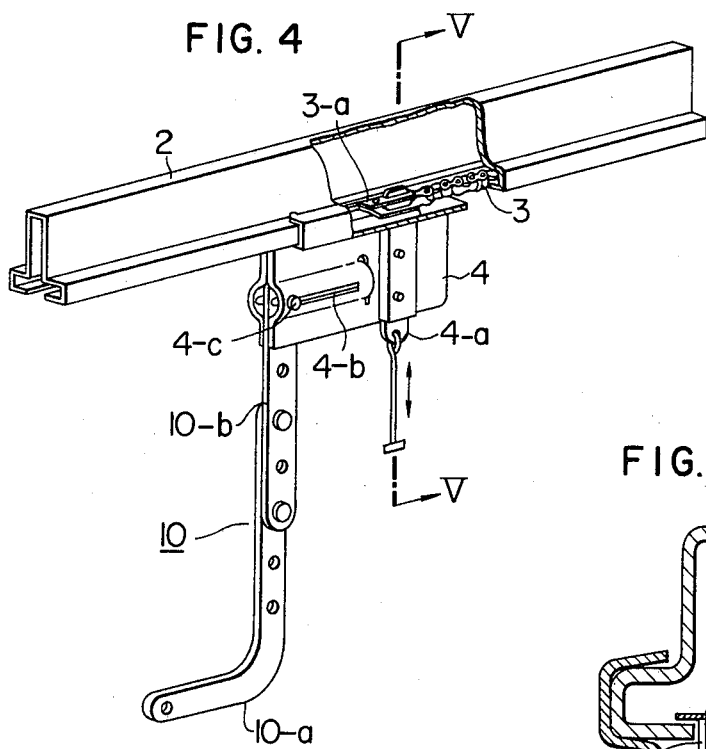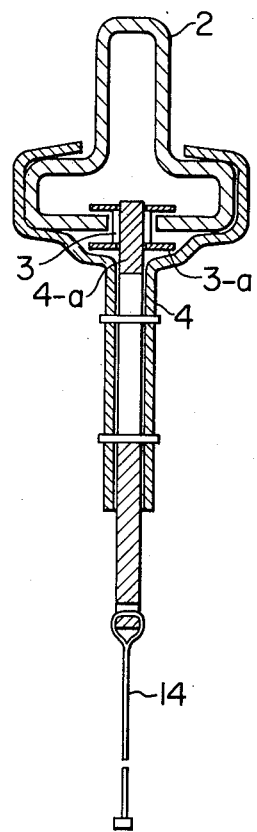

AUTOMATIC DOOR CONTROL APPARATUS

The present invention relates to an automatic door operation control apparatus, or more in particular to an automatic door operation control apparatus adapted to compensate for a fault, if any, of fault and condition detector means of a main control unit.

One of the U.S. Patent Applications relating to an automatic door control apparatus was filed on Feb. 20, 1980 as Application Ser. No. 123,086, now U.S. Pat. No. 4,328,540. In the invention of this application, data on control of a door are stored in advance in a memory unit as a program containing command codes, and a door driving system is controlled in such a manner that an optimum manner of door control is determined by logical decision on the basis of a door operating command, a detection signal indicating the door in movement and the program in execution.

In the event that such a control system runs out order or a detector for detecting the condition of the door in movement becomes faulty, however, it is impossible to control the door driving means properly. As a result, even when the door driving means is required to be stopped, the driving power may continue to be supplied to the door driving means, thereby often causing a serious accident.

More specifically, the sensors or detectors for detecting the door operating conditions include an upper limit switch for detecting the limit of door movement in one direction, a lower limit switch for detecting the limit of door movement in the other direction and an obstruction detector switch for detecting the fact that the door in movement has encountered an obstacle and is prevented from moving. The door driving control system is required to process the data supplied from these switches in order to accurately control the door driving means. Faults which may be caused in these condition detectors and the control system include:

(1) the inoperativeness of the upper limit or lower limit switch
(2) the inoperativeness of the obstruction detection switch, and
(3) the inoperativeness of a control circuit for producing a command output to the driving means.

The fault of (1) above does not pose a serious problem in view of the fact the mechanical limit of movement should cause the obstruction detector switch to be actuated. Nevertheless, the door control becomes impossible if the obstruction detection switch becomes inoperative simultaneously with the upper and lower limit switches. The door control may probably become impossible also if the command output of the driving means is inoperative when the door condition detector means is normal.

In the even that the door control becomes impossible, serious accidents as described below may occur. If the door moves on to such an extent as to be locked, the motor in the driving means is also locked so that the lock torque thereof is applied to the obstacle, thus damaging the obstacle. This condition continues until a thermal protector of the motor is activated, and in an extreme case, the motor burns causing a fire. If the obstacle is a person, he may be killed.

The conventional protective means use transmission of the driving power of the driving means. For instance, power is transmitted through a belt or a pulley provided with an adjusting mechanism for giving a predetermined tension to the belt, so that the belt may slip in response to a force exceeding a certain limit. In this method, however, the belt may be broken by being worn while slipping with the motor. Also, the mechanism is complicated and high in cost. Further, a force continues to be exerted undesirably on the obstacle until the thermal protector is actuated. Furthermore, the service life of the motor is shortened by supplying power thereto until the thermal protector is actuated.

An object of the present invention is to provide a highly safe automatic door operation control apparatus comprising an auxiliary control device, in addition to the main control device, as back-up measure to provide for a fault of the condition detector means or the main control device, wherein whether or not the main control device is working as predetermined is totally decided, and if the main control device is not working in a predetermined manner during a predetermined period of time, the auxiliary control device is immediately actuated thereby to maintain the safe condition of the driving means.

According to one aspect of the present invention, in view of the fact that the time of door movement (opening and closing) varies to some degree with the door weight balance or the change the source voltage, time setting means is set at a time length longer to some degree than the maximum door movement time taking such variations into account. With the start of door movement, the time control means is actuated. If the driving means fails to attain a predetermined condition within the set time, the power supply is cut off, or the motor is stopped or reversed, thus at least changing the door moving condition. In this way, the load on the obstacle or the mechanism is removed for a predetermined length of time.

According to another aspect of the present invention, an auxiliary control circuit decides whether or not the main control circuit is working as predetermined, in response to an input from the door condition detector means or an operation input signal. In accordance with the decision output of the auxiliary control circuit, the motor is either stopped or reversed. Thus by changing the door moving condition at least, the load on the obstacle is alleviated or removed.

The above and other objects, features and advantages will be made apparent by the detailed description taken in conjunction with the accompanying drawings, in which:

FIG. 3 is a partially cut-away plan view of the body of the garage door operating apparatus;

FIG. 4 is a partially cut-away perspective view showing a coupled relation between a rail and a trolley making up part of the garage door operating apparatus;

FIG. 5 is a sectional view taken in the line V—V in FIG. 4;

Figure 1:
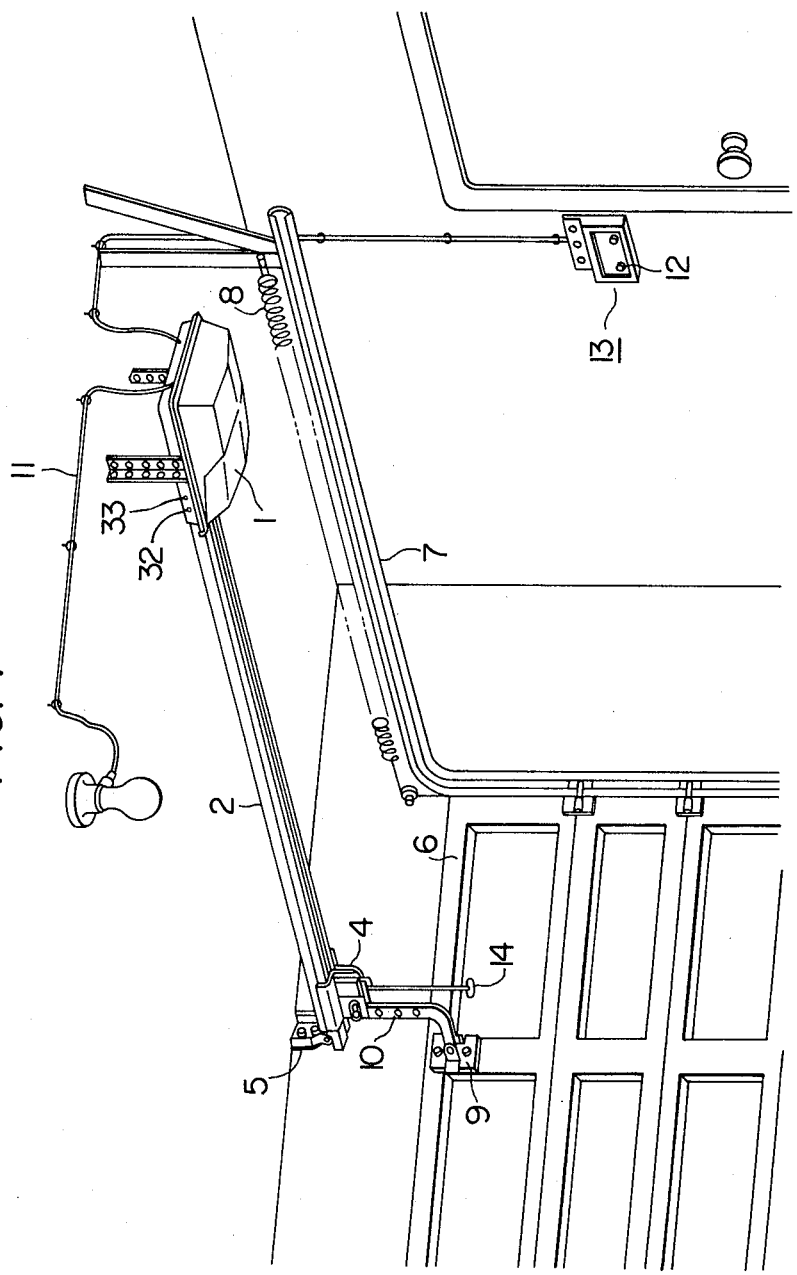
FIG. 1 is a perspective view showing a typical garage door operating apparatus mounted in a garage.

The present invention will be described in detail with reference to the drawings. As shown in FIG. 1, a garage door operating device comprises the essential parts including a body 1 housing a driving system, a rail 2 connected with the body 1, a roller chain 3 guided along the rail 2 by being driven by the driving power of the body 1, and a trolley 4 engaged with the roller chain 3 and adapted to be moved horizontally. The body 1 is hung from the ceiling of the garage by a hanger, and an end of the rail 2 is secured to part of the garage by a header bracket 5. A garage door 6, on the other hand, is generally divided into several parts coupled to each other and is opened and closed along door rail 7 on both sides thereof. The weight of the garage door 6 is balanced with a door balance spring 8 and is capable of being easily operated manually. A door bracket 9 is secured to the garage door 6. The door bracket 9 is rotatably coupled to the trolley 4 through a door arm 10. Thus the garage door 6 is closed or opened along the door rail 7 in an interlocked relation with the roller chain 3 actuated by the driving force of the body 1 and the trolley 4 horizontally moved along the rail 2 by actuation of the roller chain 3. Power is supplied to the body 1 through a power cable 11. A command for operating the body 1 is issued to the body 1 by depressing a push button switch 12 mounted on the wall of the garage or from a control 13 housing a receiver for receiving a signal in the form of electric wave or the like. Should the garage door operating device be rendered inoperative by a power failure or a like accident, a releasing string 14 decouples the roller chain 3 and the trolley 4, thus making the garage door 6 ready for manual operation.

Figure 2:
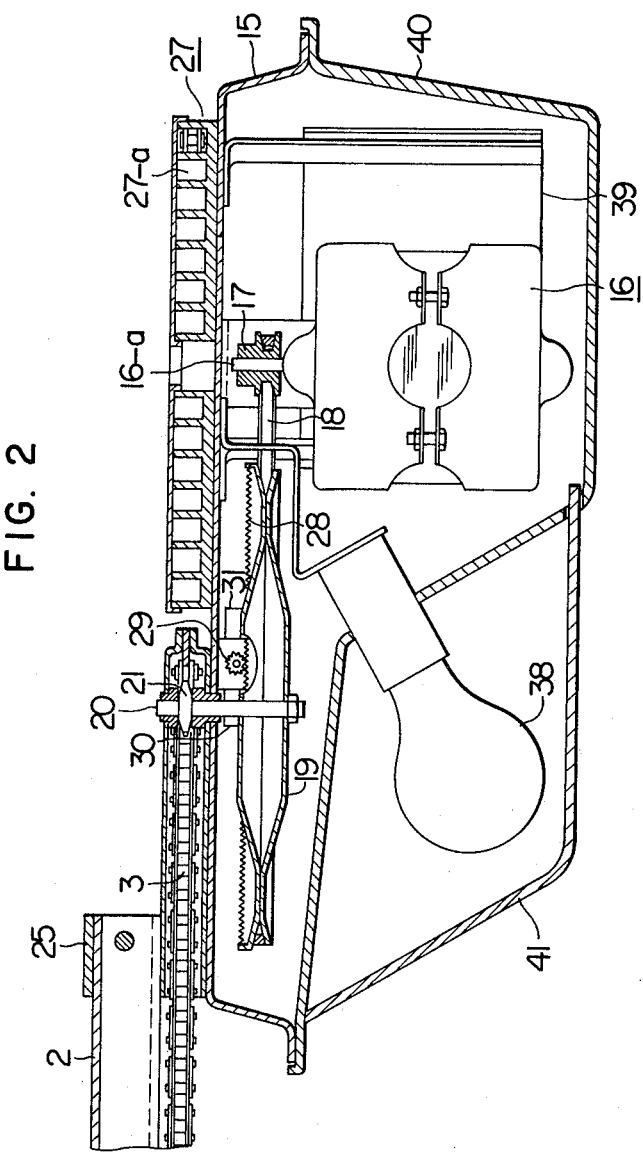
FIG. 2 is a longitudinal sectional view of the body of the garage door operating apparatus.

The construction of the body 1 of the garage door operating device will be explained with reference to FIGS. 2 and 3. FIG. 2 is a longitudinal sectional view and FIG. 3 a partially cut-away top plan view of the body 1. The turning effort of a motor 16 secured to the lower side of the body frame 15 is transmitted to a motor pulley 17 secured to a motor shaft 16-a, a V-belt 18 and a large pulley 19 sequentially. Further, the turning effort of the large pulley 19 is transmitted to a sprocket 21 through a sprocket shaft 20. The sprocket 21 is engaged with the roller chain 3 are guided by a chain guide (A) 22, a chain guide (B) 23 and a chain guide (C) 24 from both sides thereof in the body frame 15. The rail 2 is secured to the frame 15 by a rail securing metal 25 without any difference in level or a gap with a groove formed by the chain guide (A) 22 and the chain guide (C) 24. The rollers of the roller chain 3 are guided on both sides thereof by the rail 2.

The roller chain 3 taken up by the sprocket 21 is contained in a spiral chain containing groove 27-a of a chain containing case 27 secured without any difference in level or a gap with the groove formed by the chain guide (A) 22 and the chain guide (B) 23.

In this construction, the rotation of the motor 16 rotates the sprocket 21, so that the roller chain 3 is reciprocated along the rail 2.

Next, a limit mechanism for limiting the horizontal movement of the trolley 4, i.e., the upper and lower limits of the operation of the garage door 6 explained with reference to FIG. 1 will be described. The amount of movement of the roller chain 3 is converted into the amount of movement of a pulley rack 28 provided on the outer periphery of the large pulley 19 rotated at the same rotational speed as the sprocket 21. The amount of movement of the pulley rack 28 is transmitted to an upper limit switch 30 and a lower limit switch 31 through a pinion 29 in mesh with the pulley rack 28. The details of this switch mechanism are disclosed in U.S. Patent Application Ser. No. 134,867 filed on Mar. 28, 1980.

The upper limit switch 30 and the lower limit switch 31 have an upper limit adjusting knob 32 and a lower limit adjusting knob 33 respectively whereby the upper limit point and the lower limit point are freely adjustable from outside of the body.

In the case where the garage door encounters an obstruction during the downward motion thereof, it should be immediately detected and the door operation should preferably be reversed, i.e., it must be moved upward for safety's sake. If the garage door strikes an obstruction during the upward motion thereof, on the other hand, it should be detected and the door should preferably stopped immediately for safety's sake. The above-mentioned obstruction detecting mechanism will be described below.

Part of the chain guide groove formed by the chain guide (A) 22, the chain guide (B) 23 and the chain guide (C) 24 is curved. An obstruction detecting device 34 is provided which is driven by the compressive force applied to the roller chain by the downward door motion or the tensile force applied to the roller chain 3 by the upward door motion. The compressive force of the obstruction detecting spring 35 for limiting the operation of the obstruction detecting device 34 is capable of being changed by moving the spring holding plate 37 by turning the obstruction-exerted force adjusting screw 36. Also, by the operation of the obstruction detecting switch 52 which is turned on and off in response to the movement of the obstruction detecting device 34, such an obstruction as mentioned above is detected, so that the door is reversed into upward motion from downward motion, whereas it is stopped if it is in upward motion.

A lamp 38 is for illuminating the inside of the garage, which lamp 38 is adapted to be turned on or off in response to the movement of the garage door. Further, a controller 39 for controlling the motion 16 and the lamp 38 is secured to the frame 15. A body cover 40 and a lamp cover 41 cover the motor 16, the large pulley 19 and the lamp 38. The lamp cover 41 is translucent and allows the light of the lamp 38 to pass therethrough, thus brightly illuminating the inside of the garage. The foregoing is the description of the construction of the body of the garage door operating device. Next, the rail and the trolley will be explained below with reference to FIGS. 4 and 5.

The rail 2 is formed of a thin iron plate or a plastic plate and is used to slidably guide the trolley 4 along the outer periphery thereof as shown in the drawings. The rail 2 holes the rollers of the roller chain 3 from both sides thereof thereby to reciprocate the roller chain 3 in a straight line. An end of the roller chain 3 is secured to the roller chain attachment 3-a having a slot and guided in the same manner as the roller chain 3. The connecting metal 4-a is inserted into this slot. The connecting metal 4-a is slidable vertically within the trolley 4 and is normally held up by the force of a spring or the like, thus coupling the trolley 4 with the roller chain 3. In the event of a power failure or other accident when the door is required to be operated by human power by separating the garage door operating device from the door, the connecting metal 4-a is pulled down and separated from the roller chain attachment 3-a. The door arm 10 for transmitting the operation of the trolley 4 is comprised of an L-shaped door arm portion 10-a and a straight door arm portion 10-b which are coupled with the length thereof determined freely depending on the positional relation between the door and the rail. An end of the door arm 10 is connected to the trolley 4, and the other end thereof is connected to the door 6 through the door bracket 9 shown in FIG. 1. The door arm 10 and the trolley 4 are connected with each other in such a manner that a pin 4-c is inserted into the slot 4-b of the trolley 4. The pin 4-c is normally kept pressed by spring or the like as shown in FIG. 4. This is for the purpose of absorbing the shock which will occur if the door collides with an obstruction while moving down.

Further, some action must be taken to prevent the reversing of the door downward movement by erroneous obstruction detection in the presence of a small item such as a water hose or the raising of the floor surface by snow, ice or the like. Specifically, up to the height of two inches from the floor surface, it is necessary that the door movement be not reversed but stopped by detection of an obstruction. In this case, the difference of the amount of movement between the trolley 4 and the door 6 is absorbed by the slot 4-b.

A circuit for controlling the driving of the above-mentioned garage door operating apparatus will be described below.

Figure 6:
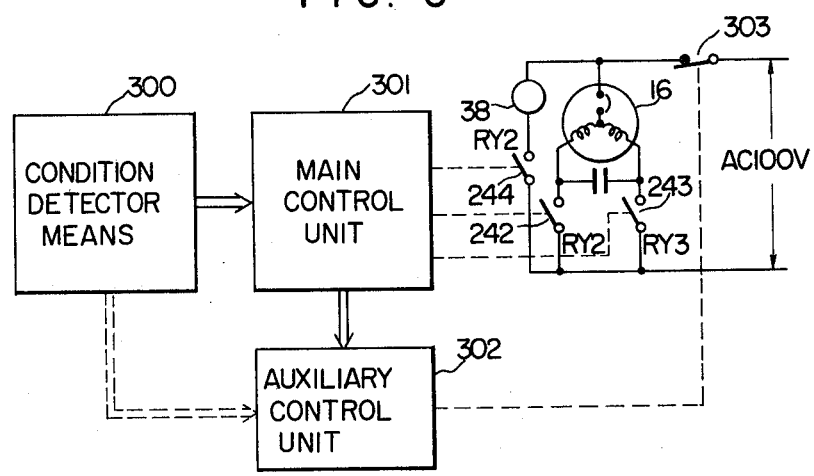
FIG. 6 is a block diagram showing an embodiment of the essential parts of the present invention.

In FIG. 6, condition detector means 300 includes an upper limit switch 30, a lower limit switch 31, an obstruction detector switch 52 and other similar detector means. A main control unit 301 is for processing the condition detection signal produced from the condition detector means 200 and controlling a motor 16 making up a part of the door driving means. This motor control is effected in such a manner that the motor 16 is driven in the normal direction, in the reverse direction or stopped by the opening and closing operations of the switches 242 and 243 through a relay circuit. An auxiliary control unit 302 performs the required counting operation in response to the control signal from the main control unit 301 or the condition detection signal from the condition detector means 300, and only in the case where the main control unit fails to work as predetermined wihtin a predetermined time, cuts off the power supply circuit of the motor 16 by the relay switch 303. In this way the current to the motor 16 is cut off, thus preventing an accident.

Next, the operation of the main control circuit 301 will be explained.

Figure 7:
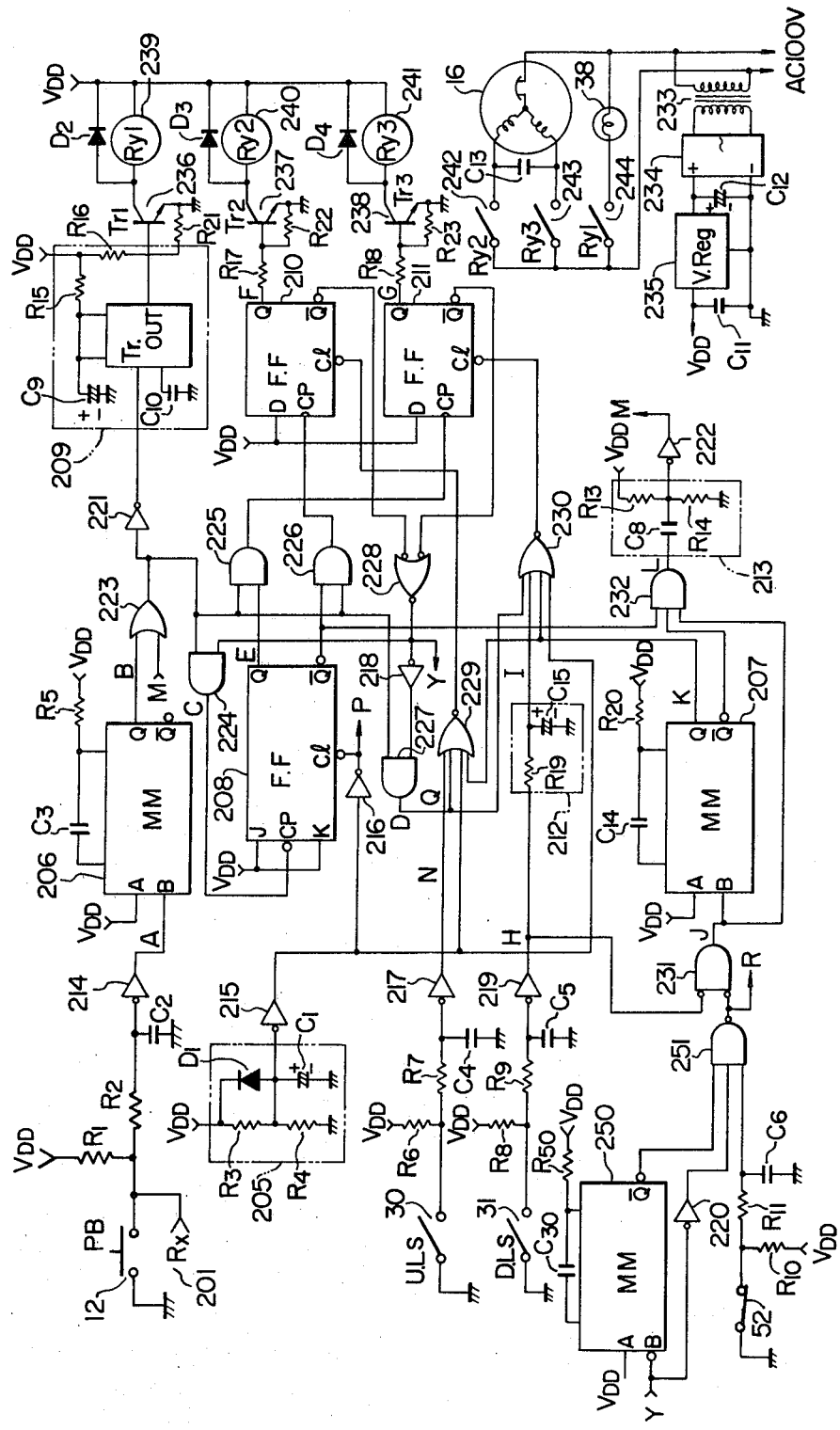
FIG. 7 is a circuit diagram showing a main control unit and a configuration of adjacent parts relating thereto according to the present invention.

In FIG. 7, reference numeral 12 shows a door operating command push button switch numeral 201 an output terminal of a relay contact operated by the door operating command from a radio receiver, numeral 30 a door upper limit switch, numeral 31 a door lower limit switch, numeral 52 an obstruction detecting limit switch, numeral 205 a power supply reset circuit for producing a reset signal at the rise of the power supply, numerals 206, 207 and 250 monostable multivibrators, numeral 208 a J-K master slave flip-flop, numeral 209 a timer circuit using NE555 (of Signetics Corporation), numerals 210 and 211 D-type flip-flops, numeral 212 an integrator circuit, numeral 213 a differentiator circuit, numerals 214 to 222 NOT elements, numeral 223 a 2-input OR element, numerals 224 to 228 2-input AND elements, numerals 229 and 230 4-input NOR elements, numeral 231 a 2-input NOR element, numeral 232 a 3-input AND element, numeral 251 a 3-input NAND element, numeral 233 a transformer for control power source, numeral 234 a diode stack, numeral 235 an IC regulator for the control power supply, numerals 236 to 238 relay-driving transistors, numerals 239 to 241 relay coils, numerals 242 to 244 contacts of the relays, actuated by the relay coils 239 to 241 respectively, numeral 16 a door operating driving motor, and numeral 38 a lamp.

Figure 8:
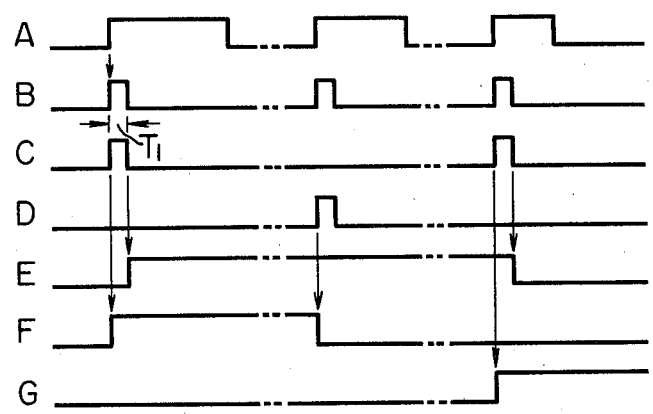
FIGS. 8 and 9 are time charts for explaining the operation of the circuit of FIG. 7.
Figure 9:
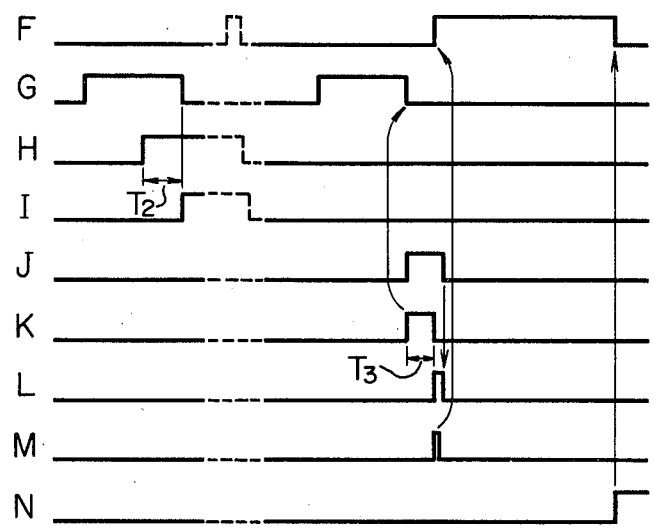

The operation of this circuit will be explained below with reference to the time charts of FIGS. 8 and 9.

When power is thrown in this circuit, a control source voltage VDD is supplied from the transformer 233 through the diode stack 234 and the IC regulator 235. The rise point of signal VDD is integrated by the power supply reset circuit 205 thereby to delay the rise thereof, so that a reset pulse is produced through the NOT element 215 which pulse is raised to high level during the delay time immediately following the power throw in. The reset pulse resets the J-K master slave flip-flop 208 through the NOT element 216, and further resets the D-type flip-flops 210 and 211 through the 4-input NOR elements 229 and 230.

Assuming that the NOT element 214 produces a signal A is response to the turning on of the push button switch 12 making up a door operation command or the reduction of the relay contact output terminal 201 connected with the radio receiver, the monostable multivibrator 206 produces a signal B of pulse width T1 at the rise point of the signal A. This signal B is applied to the 2-input OR element 223 and the 2-input AND element 224. A signal C is produced since the other input of the AND element 224 is at high level when the garage door is stationary. The signal C is applied as a clock pulse signal to the J-K master slave flip-flop 208. During the high state of the signal C before reversal of the output signal E of the flip-flop 208, the output of the 2-input AND element 226 is applied as a clock input signal to the flip-flop 210, so that the flip-flop 210 is set, thereby producing a signal F. With this signal as a door up drive command, the transistor 237 excites the relay coil 240 for door upward movement. Thus the relay contact 242 is turned on, thus driving the motor 16 in forward direction.

In this way, the motor 16 is started. At the same time, the signal B is applied as a trigger signal to the timer circuit 209 through the NOT element 221. This operation is intended to keep the lamp 38 ON for a predetermined length of time after the issue of the door operation command for illuminating the inside of the garage simultaneously with the start of the motor 16. For this purpose, the output of the timer circuit 209 excites the relay coil 239 through the transistor 236, and turns on the relay contact 244. As a result, the lamp 246 is lit for a predetermined length of time.

Next, if the upper limit switch 30 is turned on during the production of an up command output, the flip-flop 210 is reset through the NOT element 217 and the 4-input NOR element 229, so that the transistor 237 is turned off, the relay coil 240 is de-energized, the relay contact 242 is turned off, and the motor 16 stops. In the case where an operation command is issued again at the press of the push button switch 12 or by the fall to low level of the relay contact output terminal 201 connected with the radio receiver, during the production of the up command, on the other hand, the pulse signal B is produced from the monostable multivibrator 206 as mentioned above, so that an output is produced from the OR element 223. In view of the fact that the flip-flop 210 is set, however, the output of the 2-input AND element 228 is "low", thus prohibiting the output of the 2-input AND element 224. The output of the NOT element 218 is "high", and therefore, the pulse signal B is produced in the form of signal D from the 2-input AND element 227. This signal D is applied through the 4-input NOR element 229 to the flip-flop 210 as a reset signal. In this way, the motor 16 is stopped in this case, too. Upon receipt of another operating command under this condition, the output of the 2-output AND element 226 is prohibited in view of the fact that J-K master slave flip-flop 208 is set, so that the signal B is produced from the 2-input AND element 225 and the flip-flop 211 is set, thus producing the signal G. As a result, the transistor 238 is turned on, the door down drive relay coil 241 is excited, the relay contact 243 is turned on, the motor 16 is driven in the reverse direction, and thus the door is moved down.

If the lower limit switch 31 is turned on during the downward movement, a signal H is produced from the NOT element 219 and, after being delayed by time T2 at the integrator circuit 212, applied as a reset signal to the flip-flop 211 via the 4-input NOR element 230. In this way, the motor 16 is stopped as in the case of the upper limit switch being turned on during upward movement.

Next, the operation of the circuit with the obstruction detecting switch 52 turned on will be explained. Assume that the obstruction detecting switch 52 is turned on when the door is moving up, i.e., when the J-K master slave flip-flop 208 is set, the flip-flop 210 is set and the flip-flop 211 is reset. In view of the fact that the obstruction detecting switch 52 is closed at contact B, it is turned off. Thus, a "high" signal is applied to the 3-input NAND element 251. In this case, the other input terminal of the NAND element 251 is impressed with a "high" signal as mentioned later, and therefore a "low" signal is applied to the NOR element 231. The NOR element 231, the other input H of which is at low level, produces a "high" signal J and triggers the monostable multivibrator 207. The Q output pulse of the monostable multivibrator 207 resets the flip-flop 210 through the 4-input NOR element 229 thereby to stop the garage door. At this time, the J-K master slave flip-flop 208 is set and therefore the output of the 4-input AND element 232 is prohibited.

Next, assume that the obstruction detecting switch 52 is turned on during the downward movement, i.e., when the J-K master slave flip-flop 208 is reset, the flip-flop 210 is reset and the flip-flop 211 is set. A signal J is produced from the 2-input NOR element 231 via the 3-input NAND element 251, and a signal K with pulse width T3 is produced from the monostable multivibrator 207. This signal K resets the flip-flop 211 through the 4-input NOR element 230. As a result, the motor is stopped and the door stops moving down. Further, at the fall point of the pulse signal K, the output Q of the monostable multivibrator 207 rises so that the 3-input AND element 232 produces a "high" signal L. This signal L is converted into a signal M through the differentiator circuit 213 and the NOT element 222 and applied to the 2-input OR element 223. In this way, a signal F which is an up command is produced from the above-mentioned control process, with the result that the door moves up until the turning on of the upper limit switch 30 and stops in response to an output signal N of the NOR element 217.

As will be seen from above, when the door detects an obstruction, the door is immediately stopped if moving up, and it is immediately stopped and begins to move up after the time period of T3 if moving down, thus securing the operating safety. In order to prevent the obstruction detection means from being unduly actuated by a small obstacle such as a stone or a rod located near the door lower limit or the rise of the floor level due to snow in winter, the turning on of the lower limit switch 31 causes the 2-input NOR element 231 to immediately prohibit the subsequent operation of obstruction detection, and the signal G making up a down command is reset by a signal I with time delay T2 produced from the integrator circuit 212, thus stopping the door. At the time of this resetting, the door stops. During the door stoppage, the input of the obstruction detecting switch 52 is prohibited by the NOR element 231. In case where a small obstacle is located near the door lower limit, the switch 52 is off. Also in the case where the door stops with the obstruction detecting switch being actuated while the door is moving up, the switch 52 is generally off. In order to assure smooth door starting, at the fall point of the output Y of the 2-input AND element 228, namely, in response to a door start signal, the monostable multivibrator 250 is triggered and the output thereof is applied to an input of the 3-input NAND element 251 thereby to ignore the obstruction detection signal as long as the particular output is produced. The negligence of the obstruction detecting signal during door stoppage is of course attained by applying the output Y of the 2-input AND element 228 to the 3-input NAND element similarly through the NOT element 220.

Figure 10:
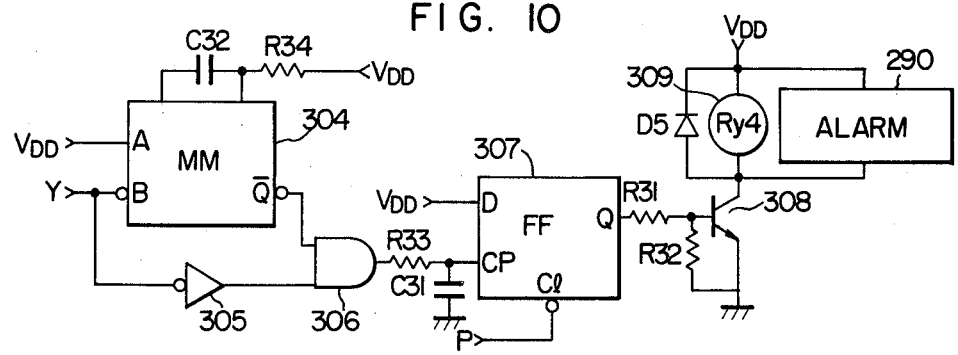
FIG. 10 is a block diagram showing an embodiment of the present invention.

The auxiliary control device 302 will be described. An embodiment of the auxiliary control device 302 according to the present invention will be explained with reference to FIG. 10. The output Y of the 2-input AND element 228 indicates whether the door is operating (at low level) or stationary (at high level). Watching the output Y of the 2-input AND element 228, the operator checks to see whether or not the output Y continues for a predetermined length of time.

A monostable multivibrator 304 is provided for setting a time longer than the maximum moving time of the door (for instance, at 23 seconds if the door moving time is 16±5 seconds). The monostable multivibrator 304 is actuated in response to the fall of the output Y of the 2-input AND element 228, namely, the door start signal. A capacitor C32 and a resistor R34 make up a constant for determining the setting time. It is decided that the main control unit is inoperative, if the output Y of the 2-input AND element 228 fails to rise to high level before the next rise of the output Q of the monostable multivibrator 304, that is, before the lapse of the set time. In order to make this decision, the output of the 2-input AND element 228 is applied through a NOT element 305 to one input terminal of a 2-input AND element 306, and further the Q output of the monostable multivibrator 304 is applied to the other output terminal of the 2-input AND element 306. If the output of the 2-input AND element 306 rises, it indicates that the main control unit is inoperative. The output of the 2-input AND element 306 sets a D-type flip-flop 307 through an integrator circuit including a resistor R33 and a capacitor C31. This integrator circuit is for eliminating the output with a short pulse width produced from the AND element 306 temporarily at the time of fall of the output Y caused by the time delay of the operation of the monostable multivibrator. The output of the D-type flip-flop 307 drives the transistor 308, that is, the relay 309. The relay contact 303 of the relay 309 is inserted in the motor driving device as shown in FIG. 6, thus making it possible to forcibly stop the operation of the door. This condition is kept until the power supply is cut off and thrown in again. Specifically, the D-type flip-flop 307 is reset by the signal P obtained by two reversals of the output of the power supply reset circuit 205 shown in FIG. 7 through the NOT elements 215 and 216. An alarm 290 is connected in parallel to the relay 309 for issuing an alarm on an abnormal condition by means of lamp or buzzer.

Figure 11:
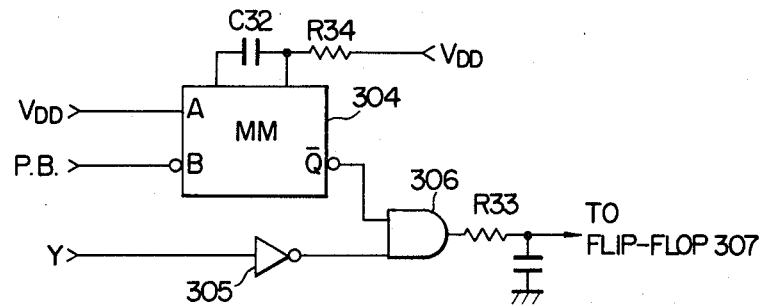
FIG. 11 is a block diagram showing a modification of part of the construction of FIG. 10.

As shown in FIG. 11, the monostable multivibrator 304 may alternatively be triggered by operation of a push button switch 12, in which case an abnormal condition is detected by the presence or absence of the output signal Y of the AND element 306 after the lapse of the predetermined length of time.

According to an embodiment of the present invention, in the event that the condition detector means or the main control device runs out of order, the driving condition of the motor is capable of being stopped after a predetermined length of time, so that an load for an excessively long period of time is prevented, thus realizing a highly safe product.

Another embodiment of the present invention will be described with reference to FIG. 12.

A circuit is provided for checking to see whether or not the output Y of the 2-input AND element 228 shown in FIG. 7 continues for a predetermined length of time. A monostable multivibrator 304 is set at a time longer than the door moving time, and turned on by a door start signal, namely, in response to the fall of the output Y of the 2-input AND element 228. Further, the output of the 2-input AND element 228 is applied through the NOT element 305 to the 2-input AND element 306. The other input terminal of the 2-input AND element 306 is supplied with the Q output of the monostable multivibrator 304. In this way, if the output of the 2-input AND element 306 rises to high level, it indicates the inoperativeness of the main control unit. The output of the 2-input AND element 306 sets the D-type flip-flop 307 through an integrator circuit including the resistor R33 and the capacitor C31. At the same time, the D-type flip-flop 310 is set. The output of the D-type flip-flop 307 triggers the transistor 308, that is, the relay 309. The relay 309 has two contacts 315 and 316 for making ineffective the operation of the relay contacts 242 and 243 through which a drive command for the motor drive means is to be applied from the main control unit.

Further, the D-type flip-flop 310 produces an output whereby the transistor 311 is turned on, thus triggering the relay 312. The contact 317 of the relay 312 is inserted in the motor drive system for upward movement, and operates effectively only when the relay 309 is operating. In other words, after an abnormal condition is detected by the output Y of the 2-input AND element 228, the door is forcibly moved upward.

Assume that the D input terminal of the D-type flip-flop 310 is kept supplied with the output G of the D-type flip-flop 211 shown in FIG. 7. If the door is detected inoperative during the downward movement thereof, the fact that the signal G is at high level raises the output W of the flip-flop 310 to high level, so that the door reverses the movement thereof upward. In the event that it is detected that the door is inoperative during the upward movement thereof, on the other hand, the output Q of the flip-flop 310 is reduced to low level, thus stopping the door due to the fact that the signal G is at low level. In this manner, a highly efficient safety control is attained.

This circuit is reset in such a manner that in view of the fact that the D-type flip-flop 307 is reset in initial stages by cut-off and reclosing of the power supply, the output of the power supply reset circuit 205 of FIG. 7 is applied to the clear terminal thereof as a signal P through the NOT elements 215 and 216. The D-type flip-flop 310 is reset by the signal applied thereto through the NOT element 313 and the 2-input AND element 314 in response to the signal P or the output Q of the NOT element 217 which rises to high level by the turning on of the upper limit switch 30.

In this way, the door may be forcibly moved upward and stopped by the upper limit switch.

According to another embodiment of the present invention, in the event that the main control circuit runs out of order while the door is moving down and is likely to cause a serious accident, the condition of downward movement of the door is cancelled, thus realizing a highly safe product.

Figure 12:
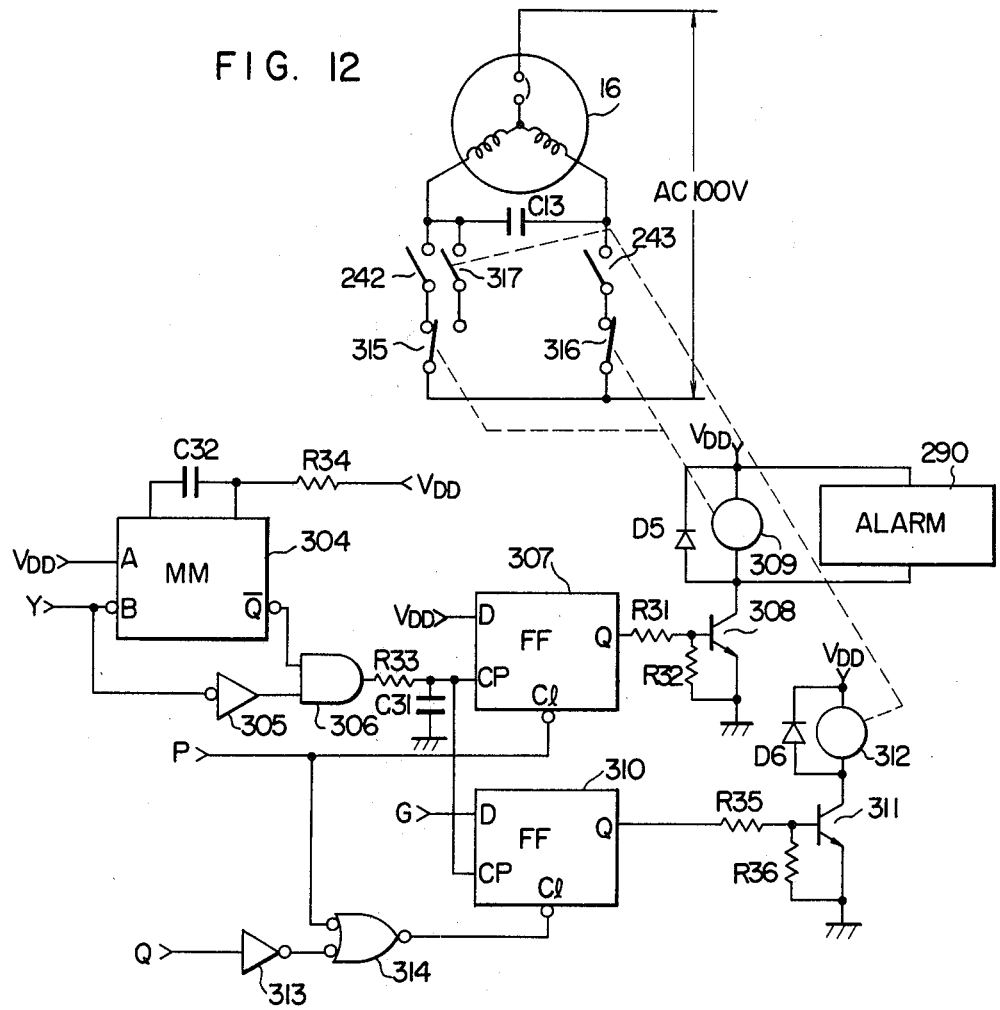
FIG. 12 is a block diagram showing another embodiment of the present invention.
Figure 13:
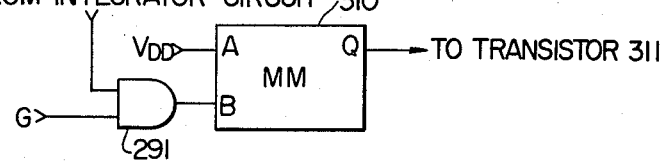
FIG. 13 is a block diagram showing a modification of part of the system shown in FIG. 12.

As another modification of an embodiment of the present invention, the D-type flip-flop shown in FIG. 12 is replaced by a monostable multivibrator 310' as shown in FIG. 13. In the case where an abnormality signal is detected from the AND element 306 during the door downward movement, the signal G representing the downward movement of the door and the particular abnormality signal are applied to an AND element 291. In this way, the monostable multivibrator 310' is triggered, so that the transistor 311 is turned on for a predetermined length of time, thus moving the door upward. In this embodiment, even if the upper limit switch 30 becomes faulty, the power circuit for the driving means is opened after the lapse of a predetermined time, and therefore the product safety is further improved.

Figure 14:
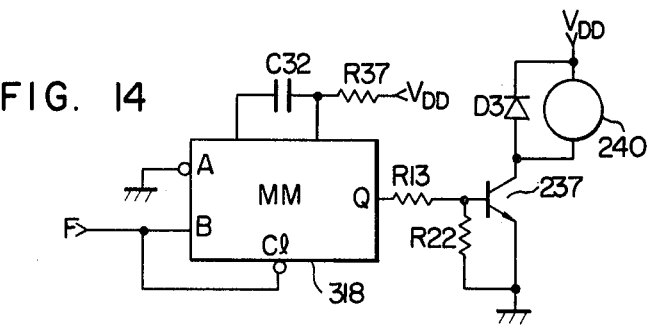
FIGS. 14 and 15 are block diagrams respectively showing other embodiments of the present invention in which the door is moving upward and downward respectively.
Figure 15:
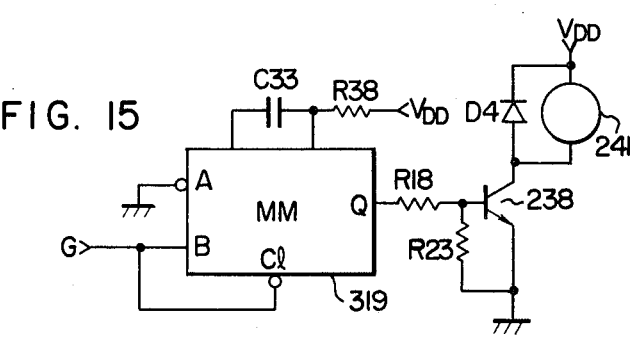

A further embodiment of the present invention will be described with reference to FIGS. 14 and 15. The diagrams of FIGS. 14 and 15 show circuit configurations in which monostable multivibrators 318 and 319 are respectively inserted between the output of the D-type flip-flop 210 and the resistor R17 and between the D-type flip-flop 211 and the resistor R18 in FIG. 7. The monostable multivibrators 318 and 319 are respectively supplied with a door up command F and a door down command G respectively from the D-type flip-flops 210 and 211. The set time of these monostable multivibrators is rendered longer than the maximum door movement time, and the monostable multivibrators 318 and 319 are set at the rise point of the command signals F and G respectively while they are reset at the fall time point of these command signals. If the command signals F and G fail to fall within the set time, the monostable multivibrators 318 and 319 are reset after the lapse of the set time. Thus the relay 240 or 241 is turned off, and the motor 16 is stopped, thereby providing a simple circuit capable of accurate and safe operation.

Figure 16:
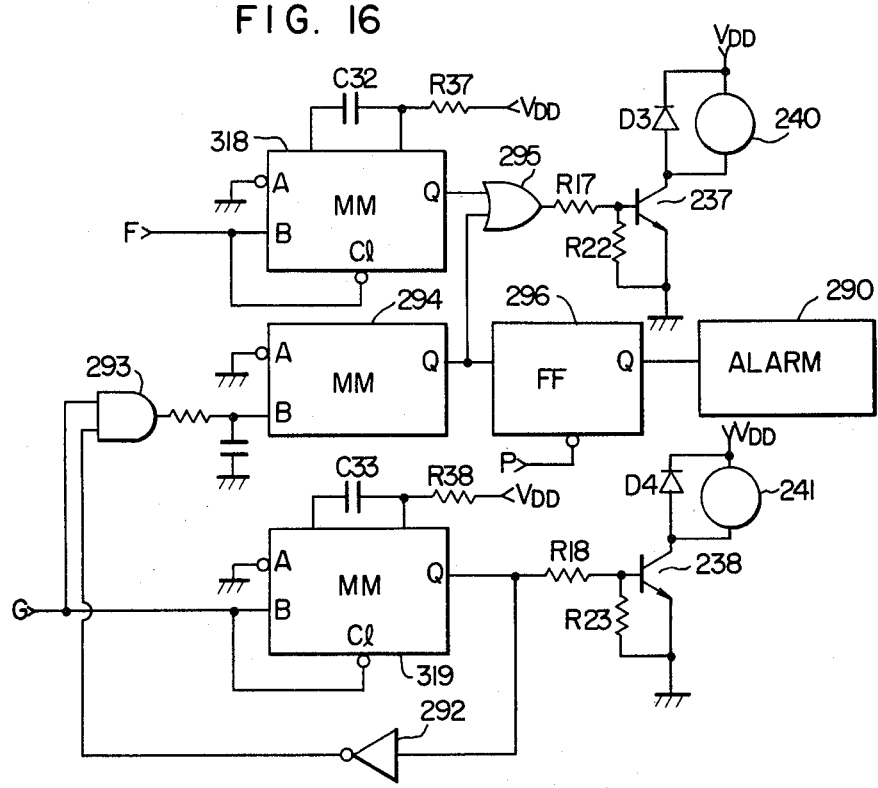
FIG. 16 is a block diagram showing a further embodiment of the present invention.

A further developed form of the circuit shown in FIGS. 14 and 15 is shown in FIG. 16. This circuit is such that the door is moved upward for a predetermined length of time if an abnormal condition occurs during the downward movement of the door. The circuit operates in the same manner while the door is moving up as in the case shown in FIG. 13. If an abnormal condition occurs during the door downward movement, however, the output of the monostable multivibrator 319 is reduced to low level immediately after the lapse of the set time, and after being reversed to high level through the NOT element 292, applied to one of the input terminals of the AND element 293. The output input terminal of the AND element 293 is supplied with the down command G. Under an abnormal condition, therefore, the fact that the down command G is maintained at high level even after the lapse of the set time of the monostable multivibrator 319 causes the AND element 293 to produce an output of high level. This signal triggers the monostable multivibrator 294 via an integrator circuit including a resistor and a capacitor, so that a high level signal is produced at the Q terminal for a predetermined length of time. This high level signal turns on the transistor 237 through an OR element 295, and therefore the door is moved up as long as the set time of the monostable multivibrator 294. The technical effect of this circuit operation is similar to that described with reference to FIG. 12. The output of the monostable multivibrator 294 sets the flip-flop 296, thus actuating the alarm 290. The flip-flop 296 is reset by the signal P. As a result, the occurrence of an abnormal condition is announced by the alarm 290 so that when the door is stationary, a normal condition is clearly distinguished from an abnormal condition.

In the aforementioned embodiments, the door up or down signal is obtained from a logic signal of the main control circuit. As an alternative method, the output of the relay contact in the last stage may be utilized or the direction of driving the motor may be directly detected by a relay or other means with equal effect without departing from the spirit of the invention.

Further, the above-mentioned embodiments are such that power is thrown off and thrown in again for resetting the auxiliary control circuit after detecting a fault. Instead of this method, an exclusive reset button switch may be provided to generate the signal P with equal effect in embodying the present invention.

The counting means 304, 318 and 319 included in the auxiliary control unit shown in FIGS. 10 to 16 are so configured as to start the counting operation in synchronism with the door start substantially. This counter means may alternatively be so configured that the counting operation is started when the condition detector means 300 detects a condition under which the door is required to be stopped or when an operating input for stopping the door is applied thereto.

The main control unit 301 operates as shown below in response to the door stop operation or the detecting operation of the condition detector means 300 during the door upward or downward movement.

(1) During upward movement, the upper limit is detected and the door is stopped.
(2) During downward movement, the lower limit is detected and the door is stopped.
(3) During upward movement, an obstruction is detected and the door is stopped.
(4) During downward movement, an obstruction is detected and the door is moved up.
(5) Operated in response to a door operating input, and the door is stopped.

It takes a comparatively short certain length of time for the main control unit 301 to reach a predetermined state in response to the detection by the condition detector means 300 or the door stop operating input. This time length is sufficiently shorter than one second. In the apparatus so configured that the counting means of the auxiliary control unit starts counting in response to the detection signal of the condition detector means or the like, therefore, a set time of about one second is recommended. The construction of the auxiliary control unit is basically identical with that shown in FIGS. 10 and 12, except for a certain different part shown in FIG. 17.

Figure 17:
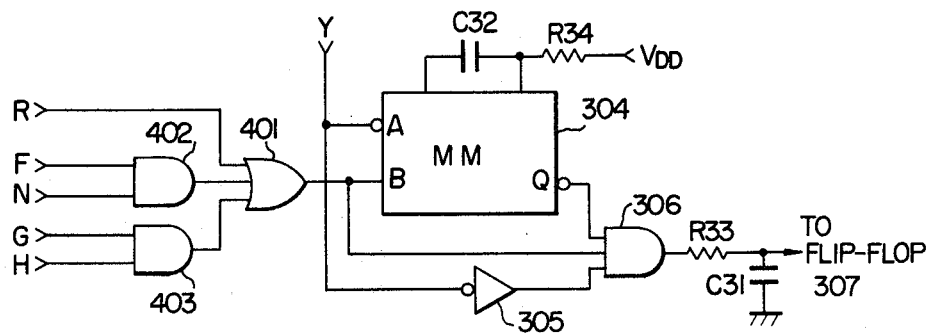
FIGS. 17 and 18 are block diagrams showing still other embodiments showing the essential parts of the circuits of FIGS. 10, 12 and 13.

In FIG. 17, the monostable multivibrator 304 is set to a time (say, one second) longer than the time of ignoring the obstruction detection input (the set time of the monostable multivibrator 250) described with reference to FIG. 7. The B input terminal of the monostable multivibrator 304 is connected to the output of the OR element 401. The three input terminals of the OR element 401 are supplied with the output R of the obstruction detection switch 52, and the outputs of the AND elements 402 and 403 respectively. The two input terminals of the AND element 402, on the other hand, are impressed with the door up signal F and the output N of the upper limit switch 30 respectively for detecting the fact that the door has reached the upper limit. The AND element 403 is impressed with the door down signal G and the output H of the lower limit switch 31 for detecting that the door moving down has reached the lower limit. Thus the monostable multivibrator 304 is triggered in response to the operation of the obstruction detection switch 52, the upper limit switch 70 or the lower limit switch 431, since the door in operation is indicated at the low level of the output Y of the 2-input AND element 228. This monostable multivibrator 304 is triggered with the A input at low level and B input at high level, and in the case where the operation of the switch 30, 31 or 52 is maintained until the lapse of the set time, i.e., until another rise of the Q output and the output Y of the 2-input AND element is at low level, it is decided that the main control means is inoperative. For this purpose, the output of the 2-input AND element 228 is applied via the NOT element 305 to an input terminal of the 3-input AND element 306, the other input terminals of the 3-input ANd element 306 being connected with the Q output of the monostable multivibrator 304 and the detection input R, F or G. If the output of the 3-input AND element 306 rises under this condition, it indicates that an inoperative condition of the main control device has been detected. The output of the 3-input AND element 306 sets the D-type flip-flop 307 through an integrator circuit made up of the resistor R33 and the capacitor C31. The subsequent operations are identical with those explained with reference to FIGS. 10, 12 and 13 and will not be described again. The B input terminal of the monostable multivibrator 304 may be impressed with the obstruction detection signal R alone. Further, the OR element 401 may be supplied with a stop operation command not shown.

The condition detector means illustrated in FIG. 17 include switch means which are turned on and off in accordance with the door moving conditions. It is a problem if these switches run out of order. If the driving power for the door increases excessively when the apparatus is operating normally, the obstruction detection switch 52 is actuated and the motor 16 is stopped or reversed, thus preventing the driving means from being overloaded for a protracted period of time. In the event that the obstruction detection switch or the main control device runs out of order, however, the driving means may be locked and is required to be relieved of this locked condition promptly. In order to meet this requirement, according to a still further embodiment, an auxiliary control device using condition detector means is provided for detecting the current consumption of the driving means. The circuit configuration of such an embodiment is basically the same as that of those embodiments shown in FIGS. 10 and 12 except for the parts shown in FIG. 18.

Figure 18:
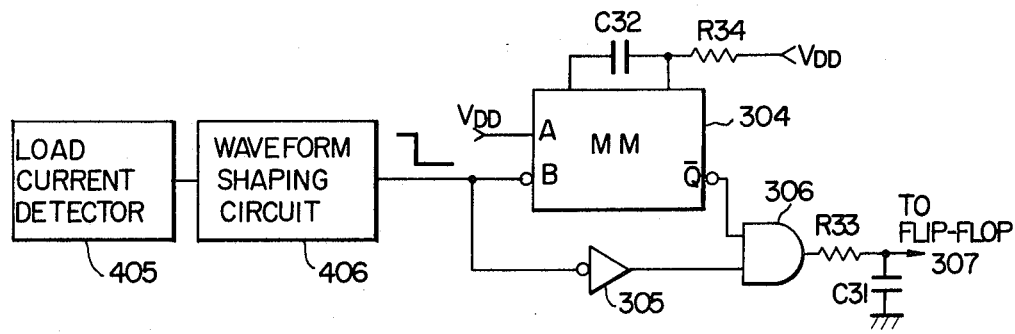

In FIG. 18, a load current detector 405 is used as a condition detector for detecting whether the load current of the motor 16 has exceeded a predetermined value. The output of this detector 405 is waveform-shaped in a waveform shaping circuit 406 and applied to the monostable multivibrator 304. After a predetermined length of time, it is checked to see whether or not this signal is maintained, i.e., it is a lock signal. A current similar to the lock current flows for a predetermined length of time at the time of start of the door (when the motor is started), and therefore the monostable multivibrator 304 is set to a time longer than such a predetermined length of time in order to distinguish the lock current from the starting current. Specifically, the monostable multivibrator 304 is triggered at the fall of the output of the waveform shaping circuit 406. It is decided that the motor is locked abnormally if the waveform shaping circuit 406 produces a low level signal output until another rise of the output Q of the monostable multivibrator 304, that is, until the lapse of the set time. For this purpose, the output of the waveform shaping circuit 406 is applied via the NOT element 305 to an input terminal of the 2-input AND element 306. The other input terminal of the 2-input AND element 306 is supplied with the Q output of the monostable multivibrator 304. If the output of the 2-input AND element 306 arises, it indicates that an inoperative state of the control system is detected. The output of the 2-input AND element 306 sets the D-type flip-flop 314 through an integrator circuit including the resistor R33 and the capacitor C31. The subsequent operations are the same as those described with reference to FIGS. 10, 12 and 13 and will not be described again.

According to the embodiment under consideration, abnormal conditions including an obstruction which are different from the normal processing conditions are capable of being accurately detected. Further, this detection signal is used to cut off or reverse the driving condition of the motor for a certain period of time, thus realizing a highly safe product.

Instead of detecting the load current of the motor, an abnormal condition may be detected as distinguished from the normal driving conditions by the means described below.

(1) Detection of the motor rotational speed by such means as tacho-generator.
(2) An auxiliary obstruction detection switch which may be provided separately from the obstruction detection switch 52 and is adapted to be actuated when the switch 52 becomes inoperative.

It will thus be understood that according to this invention the load on an obstacle is cancelled after a perdetermined length of time even in the case where the main control device runs out of order, thus improving both the reliability and safety of the apparatus.

What is claimed is:
1. An automatic door operation control apparatus comprising:
  (a) a door operating device coupled to a door for operating said door,
  (b) driving means for driving said door operating device thereby to open and close said door,
  (c) condition detector means for detecting a condition under which the movement of said door is required to be discontinued,
  (d) a main control device for issuing a driving command to said driving means and controlling said driving means in response to a condition detection signal produced from said condition detector means, and
  (e) an auxiliary control device including:
    counting means set to a time longer than the maximum moving time of said door under normal conditions,
    said counting means starting the counting operation substantially at the same time as the starting the driving of said driving means, and
    a control circuit for discontinuing the operation of said driving means regardless of the driving command of said main control device in the case where a driving command continues to be applied to said driving means from said main control device after the lapse of said set time from the start of counting of said counter means.

2. An automatic door operation control apparatus comprising:
  (a) a door operating device coupled to said door for operating said door,
  (b) driving means for driving said door operating device for opening and closing said door,
  (c) condition detector means for detecting a condition under which the movement of said door is required to be discontinued,
  (d) a main control device for issuing a driving command to said driving means and controlling the operation of said driving means in response to a condition detection signal produced from said condition detector means, and
  (e) an auxiliary control device including;
    counter means set to a time longer than the time length from the receipt of said condition detection signal by said main control device to the issue of a driving command to said driving means for changing the driving condition thereof, said counter means starting the counting operation in response to said condition detector means, and
    a control circuit for discontinuing the operation of said driving means regardless of the driving command of said main control device in the case where the driving command continues to be issued to said driving means from said main control device after the lapse of said set time from the start of the counting operation of said counter means.

3. An automatic door operation control apparatus comprising:
  (a) a door operating device coupled to a door for operating said door, (b) driving means for driving said door operating device and opening and closing said door,
(c) condition detector means for detecting that a load exceeding a predetermined value is imposed on said driving means,
(d) a main control device for issuing a driving command to said driving means and controlling the operation of said driving means in response to a condition detection signal produced from said condition detector means, and
(e) an auxiliary control device including;
counter means set to a time longer than a time during which the load on said driving means at the time of start thereof is larger than a predetermined value, said counter means starting the time counting operation in response to said condition detector means, and
a control circuit for discontinuing the operation of said driving means regardless of the driving command of said main control device in the case where a driving command continues to be issued to said driving means from said main control device after the lapse of said set time from the start of the counting operation of said counter means.

4. An automatic door operation control apparatus according to claim 1, 2 or 3, wherein said driving means includes a driving motor for driving said door operating device, and said auxiliary control device is adapted to cut off power supply to said motor.

5. An automatic door operation control apparatus according to claim 3, wherein said condition detector means detects whether the load current supplied to said driving means has exceeded a predetermined value.

6. An automatic door operation control apparatus comprising:
(a) a door operating device coupled to a door for operating said door,
(b) driving means for driving said door operating device and opening and closing said door,
(c) condition detector means for detecting a condition under which the movement of said door is required to be discontinued,
(d) a main control device for issuing a driving command in order to control the driving condition of said driving means in response to a condition detection signal from said condition detector means, and
(e) an auxiliary control device set to a time longer than the maximum moving time of said door under normal conditions, said auxiliary control device setting a counting operation in response to a door driving command from said main control device and resetting said counting operation in response to a door driving stop command from said main control device, said auxiliary control device resetting said counting operation regardless of the driving command from said main control device after the lapse of said set time from the setting of said counting operation, said auxiliary control device driving said driving means for the period from the setting of said counting operation to the resetting thereof.

7. An automatic door operation control apparatus according to claim 1, 2 or 6, wherein said condition detector means includes means for detecting one limit of movement of said door, means for detecting the other limit of movement of said door, and means for detecting an obstruction, if any, encountered during the movement of said door.

8. An automatic door operation control apparatus according to claim 1, 2, 3 or 6, wherein said auxiliary control device stops the operation of said driving means in the case where said driving means fails to reach a predetermined condition before the lapse of said set time from the start of said counting operation.

9. An automatic door operation control apparatus according to claim 1, 2, 3 or 6, wherein said auxiliary control device actuates said driving means in a manner to stop the opening of said door if being opened, and actuates said driving means in a manner to open said door if said door is being closed, in the event that said driving means fails to reach a predetermined condition before the lapse of said set time from the start of said counting operation.

10. An automatic door operation control apparatus according to claim 1, 2, 3 or 6, wherein said auxiliary control device actuates said driving means in a manner to open said door for a predetermined length of time if said door is being closed in the event that said driving means fails to reach a predetermined condition before the lapse of said set time from the start of said counting operation.

11. An automatic door operation control apparatus according to claim 1, 2, 3 or 6, wherein said auxiliary control device deactivates said driving means if the door is being opened, and deactivates said driving means for a predetermined length of time if the door is being closed, in the event that said driving means fails to reach a predetermined condition before the lapse of said set time from the start of said counting operation.

12. An automatic door operating control apparatus according to claim 1, 2, 3 or 6, wherein said auxiliary control circuit includes announcing means for issuing an alarm in the event that said driving means fails to reach a predetermined condition before the lapse of said set time from the start of said counting operation.

* * * * *